United States Patent
Jalkanen et al.

(10) Patent No.: US 8,166,180 B2
(45) Date of Patent: Apr. 24, 2012

(54) HANDING A REQUEST RELATING TO A SERVICE

(75) Inventors: Tero Jalkanen, Tuusula (FI); Jussi Laukkanen, Helskink (FI); Niclas Svahnström, Helsinki (FI)

(73) Assignee: TeliaSonera AB, Stockholm (SE)

(*) Notice: Subject to any disclaimer, the term of this patent is extended or adjusted under 35 U.S.C. 154(b) by 25 days.

(21) Appl. No.: 12/451,286

(22) PCT Filed: May 9, 2008

(86) PCT No.: PCT/FI2008/050257
§ 371 (c)(1),
(2), (4) Date: Nov. 4, 2009

(87) PCT Pub. No.: WO2008/139031
PCT Pub. Date: Nov. 20, 2008

(65) Prior Publication Data
US 2010/0064045 A1  Mar. 11, 2010

(30) Foreign Application Priority Data
May 10, 2007 (FI) .................................. 20075336

(51) Int. Cl.
G06F 15/16 (2006.01)
(52) U.S. Cl. ...................................... 709/227; 709/246
(58) Field of Classification Search .............. 709/227, 709/217, 218, 246; 370/351; 455/436
See application file for complete search history.

(56) References Cited

U.S. PATENT DOCUMENTS

| | | |
|---|---|---|
| 6,269,155 B1 | 7/2001 | Dennert |
| 7,701,872 B2 * | 4/2010 | Islam et al. ................... 370/254 |
| 7,971,228 B2 * | 6/2011 | Rosenberg et al. ............... 726/1 |
| 2003/0163545 A1 * | 8/2003 | Koskelainen et al. ........ 709/217 |
| 2006/0104211 A1 * | 5/2006 | Islam et al. ................... 370/252 |
| 2006/0154665 A1 * | 7/2006 | Svensson et al. ............. 455/436 |
| 2007/0274289 A1 * | 11/2007 | Buckley et al. ............... 370/351 |
| 2008/0021980 A1 * | 1/2008 | Korhonen et al. ............ 709/218 |
| 2010/0128685 A1 * | 5/2010 | Jiang ............................ 370/329 |

FOREIGN PATENT DOCUMENTS

| | | |
|---|---|---|
| DE | 196 08 419 A1 | 9/1997 |
| EP | 1005239 | 5/2000 |
| WO | WO2004/080092 | 9/2004 |

* cited by examiner

Primary Examiner — Aaron Strange
(74) Attorney, Agent, or Firm — Cozen O'Connor

(57) ABSTRACT

In a multi-service communication environment, when a communication establishment request is received (8-4), the request containing a service identifier and relating to a service to be invoked between a sender of the request and a recipient to whom the request is targeted, interconnection information on the service is checked (8-5, 8-6) for, how to handle the request taking into account at least the sender's operator; and the request is handled (8-7) according to an outcome of the checking. The interconnection information may contain policy rules and/or operator-specific service identifiers.

21 Claims, 4 Drawing Sheets

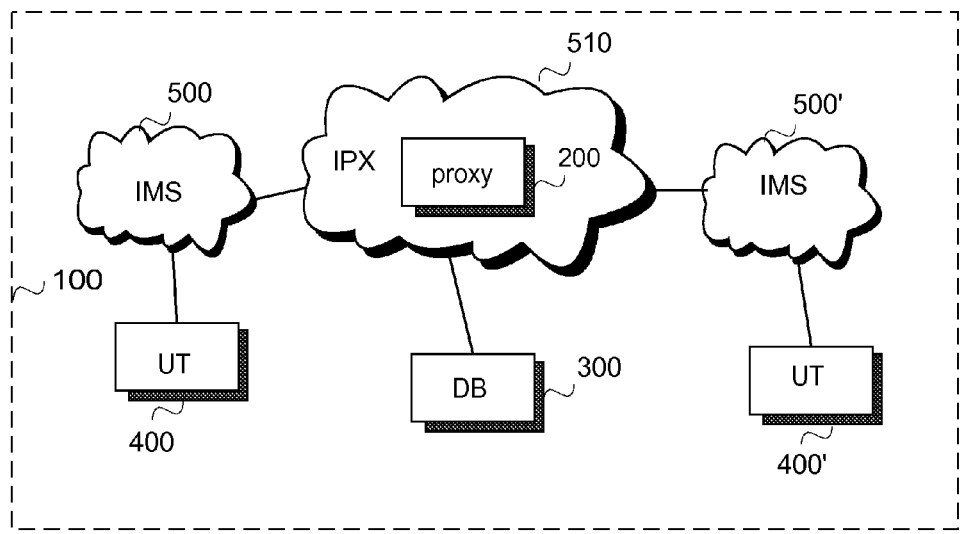
FIG.1
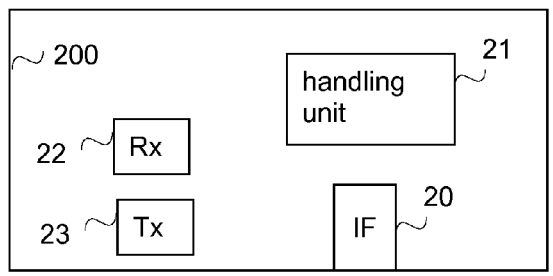
FIG.2
| service | operator A | ... | operator X |
|---------|------------|-----|------------|
| ID-1    | only A     |     |            |
| ID-N    | A, B, X allowed |  | A allowed  |
| ID-X    | none       |     |            |
| 3-1     | 3-2        |     | 3-2'       |
FIG.3

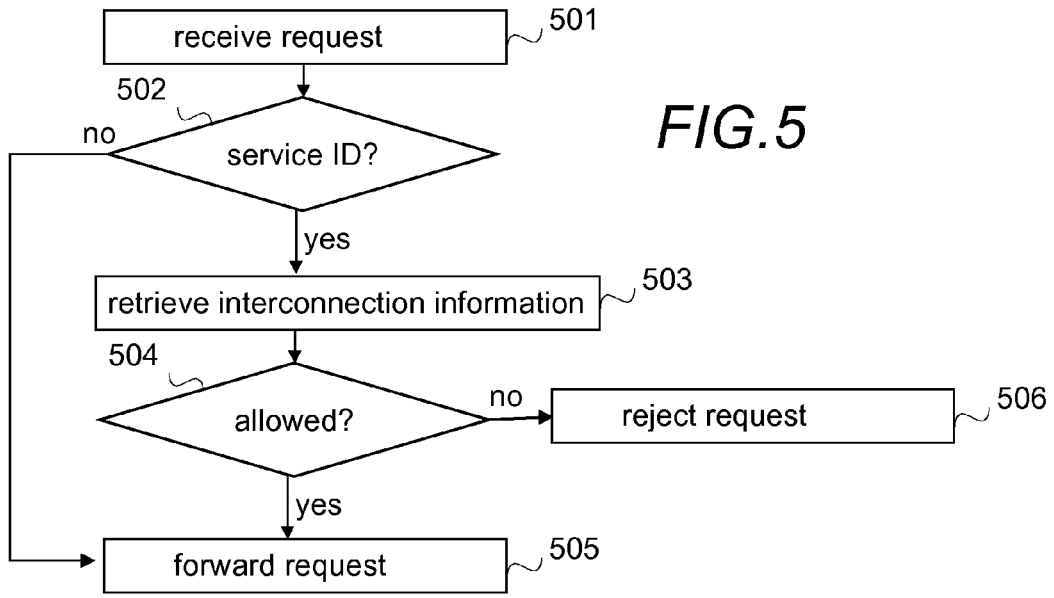
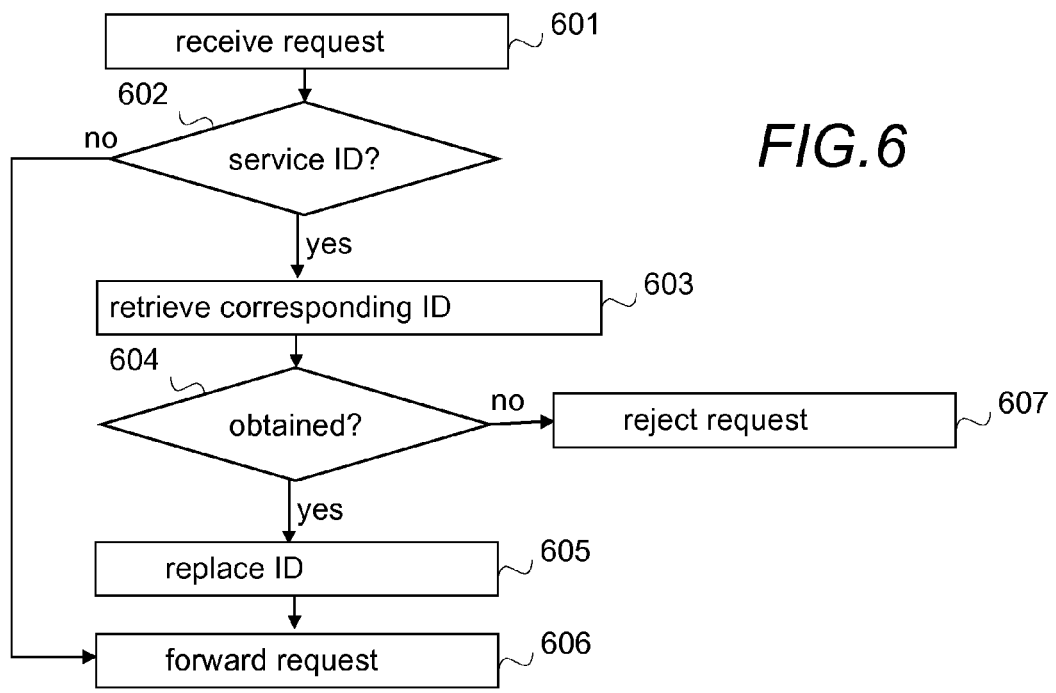

HANDING A REQUEST RELATING TO A SERVICE

PRIORITY CLAIM

This is a U.S. national stage of application No. PCT/FI2008/050257, filed on 9 May 2008. Priority is claimed on the following application: Country: Finland, Application No.: 20075336, Filed: 10 May 2007; the content of which is incorporated here by reference.

FIELD OF THE INVENTION

The present invention relates to a multi-service communication environment, and more particularly to handling a request relating to a service.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communication technology, particularly IP-based (IP, Internet Protocol) communication technology and end user terminals, has enabled versatile communication possibilities and introduction of different services. More and more often services are implemented using an IP Multimedia Subsystem IMS, such as an All-IP system standardized by the 3GPP, and employing an IP-based session control protocol, such as a SIP (Session Initiation Protocol) protocol. IMS provides multimedia services which are usually, although not necessarily, Internet-based services employing a packet protocol. SIP is an IETF defined application-layer control protocol which is not vertically integrated into a communications system but a tool to build a multimedia architecture.

In a multi-service architecture, a particular media (and enablers) can be used by a number of services. For example, IMS is a multi-service architecture that supports a number of services on a common set of enablers (an enabler is a procedure that fulfils a specific function) and uses the same access point name for different services and applications. Thus, means other than the media, access point name or enabler used is required to identify that a particular service is being requested or invoked. Although a need for a service identifier has been realized, no mechanism as to how to exploit service identifiers has been suggested.

SUMMARY

An object of the present invention is to provide an implementation exploiting service identifiers. The object of the invention is achieved by a method, a system and apparatuses which are characterized by what is stated in the independent claims. Preferred embodiments of the invention are disclosed in the dependent claims.

BRIEF DESCRIPTION OF THE DRAWINGS

In the following, the invention will be described in greater detail by means of preferred embodiments and with reference to the attached drawings, in which FIG. 1 shows a general architecture of a communication system;

FIG. 2 is a simplified block diagram of an apparatus according to an embodiment;

FIGS. 3 and 4 are simplified block diagrams of databases according to embodiments;

FIGS. 5 to 7 are flow charts illustrating the functionality of apparatuses according to embodiments.

DETAILED DESCRIPTION OF SOME EMBODIMENTS

Figure 4:
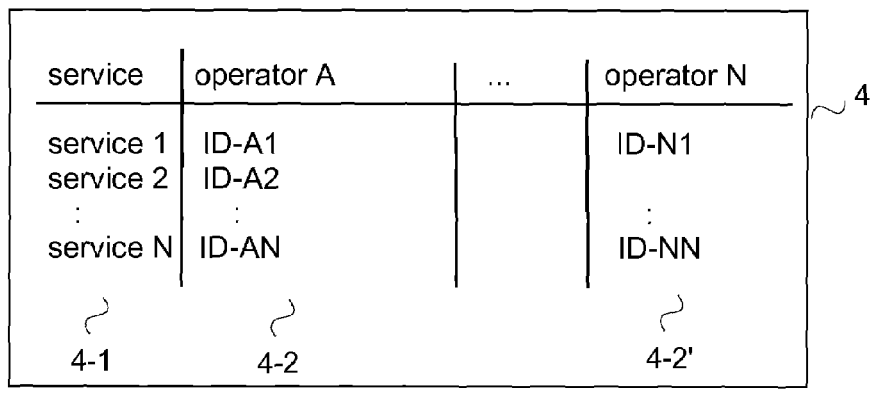

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any network node, corresponding component(s), and/or to any communication system or any combination of different communication systems that support an IP-based multi-service environment. The communication system may be a fixed communication system or a wireless communication system or a communication system utilizing both fixed networks and wireless networks. The protocols used, the specifications of communication systems and network nodes, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using as an example of a platform providing a multi-service environment IMS which is a standardized service platform for multimedia services, and as an example of a control plane SIP without restricting the embodiments to such a solution, however.

A general architecture according to an embodiment is illustrated in FIG. 1. FIG. 1 is a highly simplified system architecture only showing a communications system 100 having IMS networks 500, 500' to which user terminals UT 400, 400' may connect, the IMS networks being connected to each other via an inter operator backbone network 510 called IPX (IP packet exchange) and comprising a proxy 200 having access to a database DB 300. The connections shown in FIG. 1 are logical connections; the actual physical connections may be different. It is apparent to a person skilled in the art that the system(s) also comprise(s) other devices, system entities, functions and structures that need not be described in detail herein. Further, it should be appreciated that in another embodiment no IPX exists but the IMS networks are connected directly to each other.

A user terminal 400, 400' is a piece of equipment or a device that allows a user to interact with a communications system directly or via a computer system, that is, it presents information to the user and allows the user to input information, i.e. the user terminal is a termination point of particular communication. In other words, the user terminal 400, 400' may be any node or a host which is able to communicate with an IMS network, over an access network (not shown in FIG. 1) if such an access network exists. Examples of the user terminal include a personal computer, a game console, a laptop (a notebook), a personal digital assistant, a mobile station (mobile phone), and a line telephone.

A proxy 200 is a network node which may be transparent to user terminals, is preferably independent of application or service, and takes care of routing of traffic. As regards the terms "application" and "service", they are interchangeable here. Generally speaking, a service is a lower level concept and an application is a more specific term, but this is not always the case. For example, Image share is an application utilizing a framework provided by a multimedia telephony service, and it may be identified by a combination of an application identifier and a service identifier. However, a peer-to-peer application, such as a game, does not necessarily utilize a framework provided by a service, in which case the system identifies it with a service level identifier, although actually it is an application. In the embodiment illustrated in FIG. 1, the proxy 200 is an IPX proxy that also acts as an IPX hub, taking care of different agreements between operators. Here, the term "operator" covers network operators and service providers. An example of a proxy is illustrated in more detail in FIG. 2.

The database 300 is a data warehouse having a predetermined structure and it may be implemented as a full text database, relational database, hierarchical database, object-oriented database (XML database) or as any other database type. The database 300 may be a registry that is publicly available and controlled by a public naming organisation, an example of a registry of that type being a MIME (Multipurpose Internet Mail Extension) registry which is an official list of all MIME types assigned by the IANA (Internet Assigned Number Authority). The database 300 may be an operator database, i.e. a database maintained and owned by the operator, in which case the operator may limit access to data stored in the database. The database 300 may be a registry managed by an organisation on behalf of its members and accessible by the members only, an example of such a registry being an IR.21 database that contains IP addresses of operators' gateway nodes and is managed by the GSMA (GSM Association). Further, the database 300 may be a decentralized database behaving as a centralized database, an example of such a database type being a domain name server-type of database having a hierarchy model. In addition, the database 300 may be an internal database of a proxy, or any other apparatus. Examples of contents to be stored in a database are illustrated in FIGS. 3 and 4.

FIG. 2 is a block diagram of an apparatus according to an embodiment of the invention. Although the apparatus has been depicted as one entity, different modules and memory may be implemented in one or more physical or logical entities. The apparatus may be any network node or a host via which a connection establishment request is routed. Examples of such apparatuses include an IPX proxy, an internal proxy in an operator network, a network node comprising an IMS function, such as a call state control function, a SIP server and a SIP proxy.

The apparatus 200 is configured to handle connection establishment requests relating to services to be invoked between senders of requests and corresponding recipients. For this purpose, the apparatus comprises an interface 20 for providing access to a database, a handling unit 21 for providing handling of a connection establishment request, a receiving unit 22 for receiving different inputs, information and messages, and a sending unit 23 for sending different outputs, information and messages. The handling unit 21 is configured to retrieve data from the database via the interface, handle a request according to the retrieved data and be responsive to the receiving unit. The apparatus may also comprise memory (not shown in FIG. 2) for storing service identifiers, or related information, at least temporarily.

The functionality of the apparatus, or more precisely, different examples of a functionality of the handling unit 21, is described in more detail below in connection with FIGS. 5 to 8. It should be appreciated that the apparatus may comprise other units used in or for relaying a connection establishment request or other messages. However, they are irrelevant to the actual invention and, therefore, they need not to be discussed in more detail here.

Apparatuses, such as network nodes, or corresponding network node components, and/or other corresponding devices or apparatuses implementing the functionality of a corresponding apparatus described with an embodiment comprise not only prior art means for receiving requests and detecting requests relating to a service to be invoked, but also means for retrieving interconnection information on a service, and means for handling the request using the retrieved information. In addition, they may comprise means for replacing an identifier with another identifier, and/or means for adding an identifier to a request. More precisely, they comprise means for implementing a functionality of a corresponding apparatus described with an embodiment and they may comprise separate means for each separate function, or means may be configured to perform two or more functions. Present apparatuses comprise processors and memory that can be utilized in an embodiment. For example, the handling unit 21 may be a software application, or a module, or a unit configured as an arithmetic operation, or as a program (including an added or updated software routine), executed by an operation processor. Programs, also called program products, including software routines, applets and macros, can be stored in any apparatus-readable data storage medium and they include program instructions to perform particular tasks. Thus, the apparatus, such as an IPX proxy, may be configured as a computer or a microprocessor including at least a memory for providing a storage area used for an arithmetic operation and an operation processor for executing the arithmetic operation. Further, software routines may be downloaded into an apparatus and the memory may be removable memory detachably connected to the apparatus.

FIG. 3 depicts contents in a database according to an embodiment, in which a general service identifier, i.e. a global service identifier, or a common service identifier is used by operators to identify the same service or application. Examples of such identifiers 3-1 include an IMS communication service identifier (ICSI), an IMS application reference identifier (IARI), a public service identifier (PSI), an IMS communication service identifier and an IMS application reference, and any usable combination thereof. In the illustrated embodiment, the database 3 contains policy rules 3-2, 3-2' relating to services. Policy rules may be based on agreements between different operators, and/or operator policy. Policy rules may be operator-specific, as illustrated in FIG. 3, or common policy rules, or a combination of both. Preferably each operator maintains, i.e. adds and updates, operator-specific policy rules to different services. Examples of policy rules determined by operator A for operators' subscribers in the example of FIG. 3 are that service ID-1 can be used only within operator A's subscribers, service ID-N is usable between operator A's, B's and X's subscribers, and that service ID-X has no policy rules.

FIG. 4 depicts contents in a database according to an embodiment in which operators may use their own service identifiers, and interconnection information contains operator-specific service identifiers 4-2, 4-2' associated with a service description 4-1 of a corresponding service and/or application. An advantage of using operator-specific identifiers is that the identifier used also reveals the operator, so searching for additional information and/or checking whether or not an agreement exists is thereby facilitated. Yet another advantage is that operator-specific identifiers facilitate provision of new services since there is no need to wait for a general (common/global) service identifier. It should be appreciated that an operator may use a global service identifier or a common service identifier as an operator-specific identifier. Enabling the use of operator-specific identifiers also allows mapping between operator-specific identifiers and corresponding general identifiers, thereby liberating the operators already having an operator-specific identifier to change the operator-specific identifier to a general (common/global) one when it is defined.

Although not illustrated in FIG. 4, the database may also contain common and/or operator-specific policy rules relating to a service and/or an application similar to those described above in connection with FIG. 3.

In an embodiment in which operator-specific databases are used, if a service identifier is found only on the operator's service identifier list, it may be interpreted that the service is restricted to be used only by the operator's subscribers.

In another embodiment in which operator-specific databases are used, a service not having a service identifier in both operators' service identifier lists is interpreted as a prevented service.

FIG. 5 is a flow chart illustrating a functionality of an apparatus according to an embodiment based on global identifiers. Referring to FIG. 5, in response to the apparatus receiving (step 501) a connection establishment request, such as SIP INVITE, the apparatus checks, in step 502, whether or not the request contains a service identifier, such as a feature tag in SIP INVITE. If the request contains the service identifier, the apparatus retrieves, in step 503, interconnection information using the service and the sender's operator as search keys. Then the apparatus uses the retrieved information to conclude, in step 504, whether or not the request is an allowable one. In other words, the possible policy rules reflecting agreements and policies are taken into account by checking whether or not conditions set out in policy rules are fulfilled. If the request is an allowed one, the request is forwarded, in step 505, towards the recipient. If the request is not an allowed one, the request is rejected in step 506.

For example, if the database is the one illustrated in FIG. 3, the service identifier being ID-N and sender's operator being A, the retrieved information is "allowed towards A, B, and X", and the apparatus checks whether the recipient's operator is A, X or D, and if it is, the request is forwarded: otherwise, the request is rejected.

If the request contained no service identifier (step 502), the request is forwarded, in step 505, towards the recipient.

FIG. 6 is a flow chart illustrating a functionality of an apparatus according to an embodiment enabling usage of operator-specific service identifiers. Further, in the embodiment it is assumed that if both the sender's operator and the receiver's operator have a service-identifier for the, service in the database, the service is an allowed one. Thus, the interconnection information is a service-identifier (or no service-identifier).

Referring to FIG. 6, in response to the apparatus receiving (step 601) a connection establishment request, such as SIP INVITE, the apparatus checks, in step 602, whether or not the request contains a service identifier, such as a feature tag in SIP INVITE. If the request contains the service identifier, the apparatus retrieves, in step 603, a service identifier using the sender's operator, recipient's operator and the service identifier in the request as search keys. In other words, interconnection information is retrieved in step 603.

If a service identifier was obtained (step 604), the request is concluded to be an allowable one and the service identifier in the request is replaced, in step 605, with the retrieved service identifier and the request is forwarded, in step 606, towards the recipient. By replacing the service identifier in the request with the one used in a receiving end, the receiving end can recognize the service or application, route the request to a proper place, and invoke only the requested service or application.

If a service identifier was not obtained (step 604), the request is concluded to be not allowable and, therefore, the request is rejected in step 607.

For example, if the database is the one illustrated in FIG. 4, sender's operator A, service identifier ID-A1, and recipient's operator N, the service is service 1 and the obtained identifier is ID-N1, and the request is forwarded having ID-N1 as the service identifier, whereas if a service identifier is ID-A2 while other factors remain the same, no service identifier is obtained and the request is rejected.

If the request contained no service identifier (step 602), the request is forwarded, in step 606, towards the recipient.

It should be appreciated that search keys and the amount of different search keys used in step 603 to obtain interconnection information depend on the database structure used and on the information stored therein. Further, the retrieval may be performed in phases.

Figure 7:
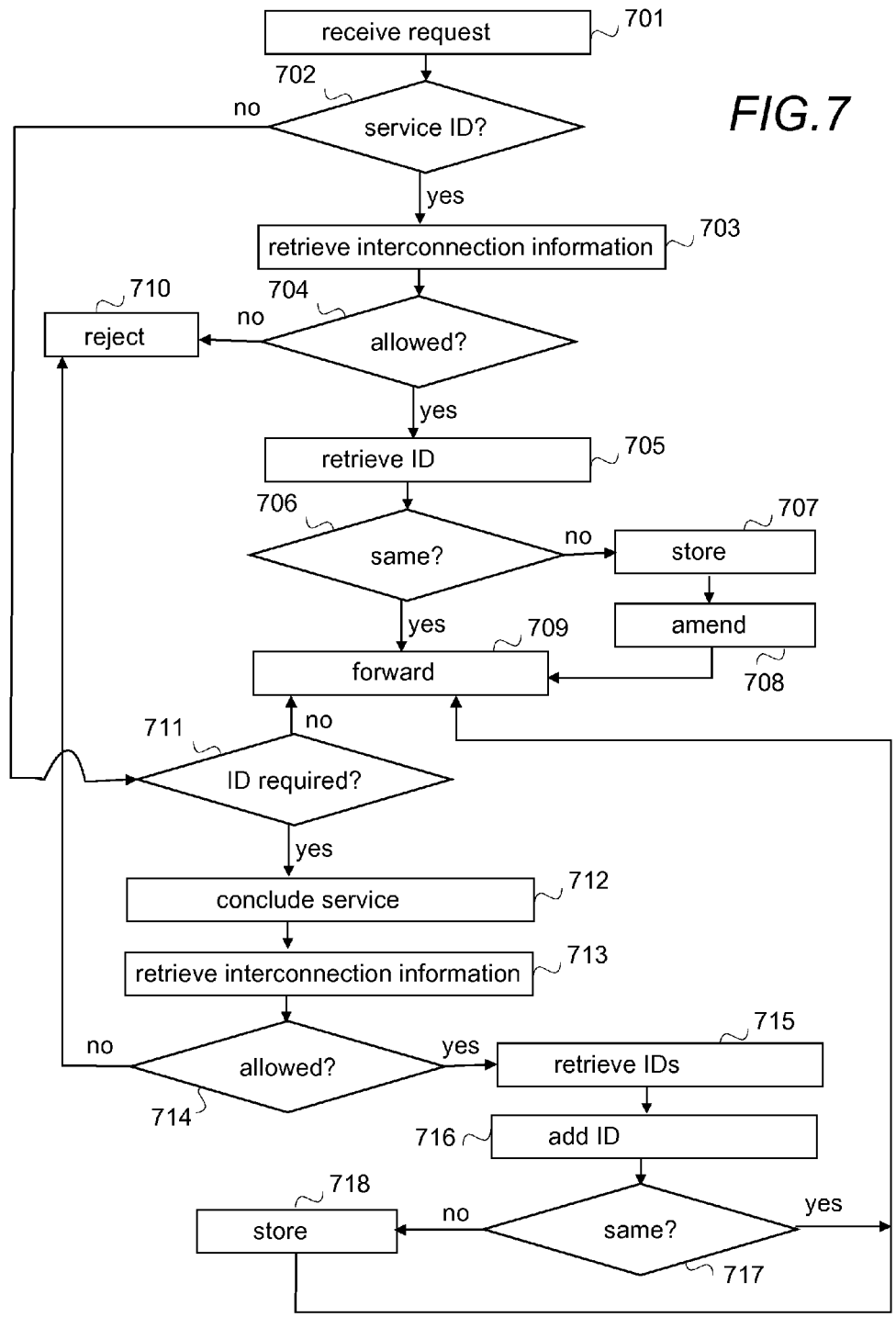

FIG. 7 is a flow chart illustrating a functionality of an apparatus according to an embodiment. Referring to FIG. 7, in response to the apparatus receiving (step 701) a connection establishment request, such as SIP INVITE, the apparatus checks, in step 702, whether or not the request contains a service identifier, such as a feature tag in SIP INVITE. If the request contains the service identifier, the apparatus retrieves, in step 703, interconnection information using the sender's operator and the service identifier as search keys. Then the apparatus uses the retrieved information to conclude, in step 704, whether or not the request is an allowable one. In other words, the possible policy rules reflecting agreements and policies are taken into account by checking whether or not conditions set out in policy rules are fulfilled. If the request is an allowed one, the apparatus then retrieves, in step 705, the service identifier of the operator of the recipient for the service from the database. Then the apparatus checks, in step 706, whether or not the service identifiers are the same. If they are different, the apparatus temporarily stores, in step 707, the service identifier pair to be used during the session. Further, the apparatus replaces, in step 708, the service identifier in the request with the retrieved service identifier and the request is forwarded, in step 709, towards the recipient.

If the service identifiers are the same (step 706), the request is forwarded, in step 709, towards the recipient.

If the request is not an allowed one (step 704), the request is rejected in step 710.

If the request contained no service identifier (step 702), the apparatus analyzes, in step 711, whether or not the connection establishment request is of a type requiring a service identifier. The apparatus examines the headers in the SIP INVOKE, including SDP (Session Description Protocol) headers, and the requested media, and, by using this information, concludes whether or not a service identifier is required. The apparatus may, for example, contain configuration information, or have access to such information, the configuration information indicating that with this type of header information and media a service identifier is required.

If a service identifier is required, the apparatus concludes, in step 712, what the service is. The conclusion is preferably based on the above-described analysis and/or configuration information. Then the apparatus retrieves, in step 713, interconnection information using the sender's operator and the service as search keys. Then the apparatus uses the retrieved information to conclude, in step 714, whether or not the request is an allowable one. If the request is an allowed one, the apparatus then retrieves, in step 715, from the database both the service identifier of the operator of the sender for the service and the service identifier of the operator of the recipient for the service. Then the apparatus adds, in step 716, the retrieved service identifier of the operator of the recipient to the request. An advantage of this feature is that forwards messages relating to the service contain a service identifier, thereby enabling it to be added to charge records, for example. The apparatus further checks, in step 717, whether or not the service identifiers are the same. If they are different, the apparatus temporarily stores, in step 718, the service identifier pair to be used during the session, and the request containing the service identifier is forwarded, in step 709, towards the recipient. If the service identifiers are the same (step 717), the request containing the service identifier is forwarded, in step 709, towards the recipient.

If the request is not an allowed one (step 714), the request is rejected in step 710.

If the request contained no service identifier (step 702) and no service identifier is required (step 711), the request is forwarded, in step 709, towards the recipient.

By storing the service identifier pair the apparatus is able to distinguish between sessions and further messages in a session in which a service identifier is to be amended and those in which there is no need to amend the service identifier. This minimizes the processing load of the apparatus. A further advantage of storing the service identifier pair is that the amount of database inquiries is minimized. However, instead of storing the service identifier pair, another indication, such as a flag in session information maintained in the apparatus, can be used.

Figure 8:
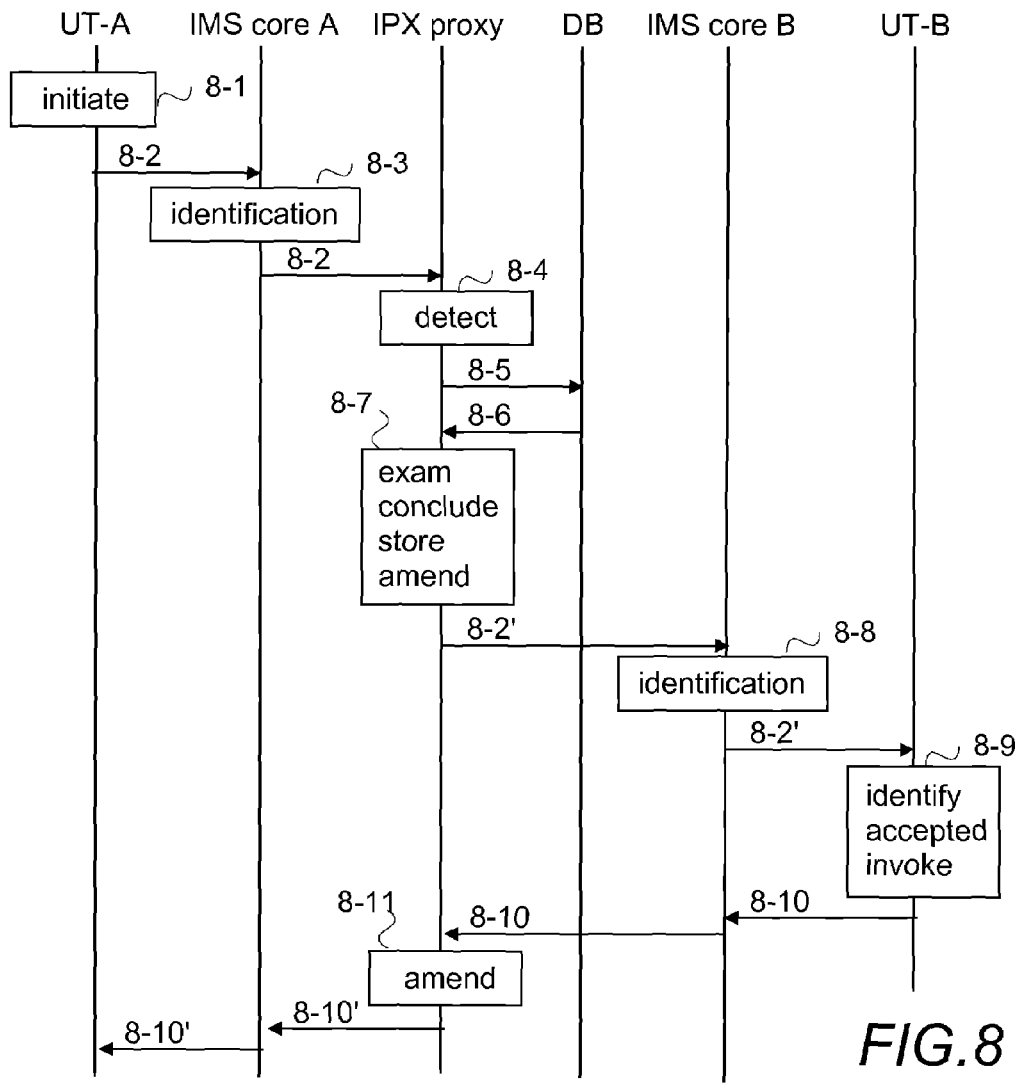
FIG. 8 illustrates signalling according to an embodiment.

FIG. 8 is a signaling flowchart illustrating signaling according to an embodiment in which SIP is used and which supports operator-specific service identifiers. In the illustrated example it is assumed that a user A is a subscriber of operator A having an IMS core A network, and a user B is a subscriber of operator B having an IMS core B network, the networks being connected via an IPX network containing an IPX proxy connected to a database DB.

Referring to FIG. 8, the user A wishes to share a video with the user B. Therefore, a connection establishment is initiated in point 8-1 in user A's user terminal UT-A and a service establishment request SIP INVITE 8-2 containing a feature tag "gsma.vs" is sent. The feature tag "gsma.vs" is the operator A's service identifier for the video sharing service. In response to the feature tag in the request 8-2, the IMS core A identifies, in point 8-3, the service, and a proper SIP application server is invoked, for example. The IMS core A may also store the feature tag for charging purposes, or use it for policy control, for example, to offer a suitable quality of service (QoS) in an access network. However, this is not illustrated in FIG. 8.

The IMS core A routes the request 8-2, on the basis of user B's address in the request, to an IPX network, in which an IPX proxy receives the request. In response to receiving the request, the IPX proxy detects, in point 8-4, the feature tag and makes a query 8-5 to a database DB using the feature tag as one search key. The database DB returns a query response 8-6 with interconnection information. Then the IPX proxy examines, in point 8-7, the interconnection information and concludes, in point 8-7, that video sharing between the user A's operator and the user B's operator is allowable but that the recipient's operator uses "turbocall.op2.com" as a service identifier for the video sharing service. Therefore, the IPX proxy amends, in point 8-7, a contact header field in the SIP INVITE request to contain "turbocall.op2.com" instead of "gsma.vs", and then forwards the amended connection establishment request 8-2' towards the user terminal UT-B. The IPX proxy further stores, in point 8-7, the service identifiers to be used with the session.

In response to the feature tag in the request 8-2', the IMS core B identifies, in point 8-8, the service, and a proper SIP application server is invoked, for example. However, this is not illustrated in FIG. 8. The IMS core B then routes the request 8-2' to the user's B user terminal UT-B.

UT-B identifies, in point 8-9, the service on the basis of the feature tag in the request 8-2', asks, in point 8-9, for user acceptance for the service, and in response to the user accepting the service, invokes, in point 8-9, the service application. UT-B also returns a response 8-10 to the request, the response being in this example 200 OK containing a feature tag "turbocall.op2.com", thereby indicating what was accepted.

The IMS core B routes the response 8-10 to the IPX network, in which the IPX proxy receives it, notices that this relates to the request 8-2' and therefore amends, in point 8-11, the feature tag in the response to be "gsma.vs" and then forwards the amended response 8-10' via the IMS core A to UT-A, which then starts sending a video (not illustrated in FIG. 8).

Although not shown in FIG. 8, when the IPX proxy receives from UT-A a further SIP message relating to this session and containing the feature tag, it amends the feature tag in the message to the feature tag used by UT-B (and IMS core B), and vice versa.

In another embodiment of the invention, the IPX proxy does not store the service identifiers in point 8-7 but makes a query to the database also in response to receiving the response 8-10.

Although the invention has been described above with a connection set up and SIP messages, it may be used similarly to service identifiers transmitted for other reasons and/or in other protocol messages. For example, a presence service message/document may also contain an attribute which is used to identify a service as part of the presence tuple. Co-ordination between the identifier that is used in the presence message and the service identifier to be used in the SIP signaling is provided by amending the identifier as described in one of the above embodiments with SIP messages. This has the advantage that the same identifier will always be used regardless of the protocol used to convey the identifier information, and a terminal needs to recognize only one identifier. Examples of protocols used by presence service messages include SIMPLE (SIP for instant messaging and presence leveraging extensions), XMPP (IETF extensible messaging and presence protocol) and IMPP (instant messaging and presence protocol).

Although the invention has been described above assuming that the recipient is a user terminal of another operator, the recipient may be a set of user terminals, a user terminal of the same operator and/or an application server. Examples of application servers include a SIP application server, offering value added services and residing either in the user's home network or in a third party location. The third party could be a network or simply a stand-alone application server.

Further, instead of or in addition to, the IPX proxy, a server residing in IMS core 1 and/or in IMS core 2 may perform the same functionality as the IPX proxy.

The steps/points, signaling messages and related functions described above in FIGS. 5 to 8 are in no absolute chronological order, and some of the steps/points may be performed simultaneously or in an order different from the given one. For example, steps 707 and 708 in FIG. 7 may be performed simultaneously. Other functions may also be executed between the steps/points or within the steps/points and other signaling messages sent between the illustrated messages. Some of the steps/points or part of the steps/points can also be left out or integrated together or replaced by a corresponding step/point or part of the step/point. For example, in FIG. 7 steps 703 and 705 can be combined, step 706 left out and steps 713 and 715 combined. The apparatus operations illustrate a procedure that may be implemented in one or more physical or logical entities. The signaling messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A method for an apparatus of a telecommunications system, the method comprising:
   receiving, in the apparatus, a communication establishment request relating to a service to be invoked between a sender of the request and a recipient to whom the request is targeted, the request containing information on the sender of the request and information on the recipient, the information being used for routing the request, the sender's operator using a first service identifier for the service, the recipient's operator using a second service identifier for the service;
   checking, by the apparatus, whether or not the request further contains the first service identifier identifying the service to be invoked;
   in response to the request containing a first service identifier indicating the service, the method further comprises:
   obtaining, by the apparatus, interconnection information on the service, the interconnection information indicating allowability of the service between different operators, and associating in the interconnection information the first service identifier and the second service identifier with the service;
   determining, by the apparatus, on the basis of the interconnection information and taking into account at least the sender's operator, whether to reject or forward the request; and
   if the communication request is not rejected, then replacing the first service identifier in the request with the second service identifier and forwarding the request.

2. A method as claimed in claim 1, wherein the interconnection information comprises operator-related policy rules, the determining comprises concluding on the basis of the policy rules whether or not the request is an allowable one, and the handling comprises rejecting the request if it is not an allowable one, and forwarding the request if it is an allowable one.

3. A method as claimed in claim 1, further comprising:
   concluding, in response to the request containing no service identifier, whether or not a service identifier is required;
   retrieving, in response to the service identifier being required, from the interconnection information a service identifier for the service; and
   adding the retrieved service identifier to the request before forwarding the request.

4. A method as claimed in claim 1, wherein the first service identifier is an operator-specific service identifier for the service and the second service identifier is a general service identifier for the service.

5. A method as claimed in claim 1, wherein the first service identifier is a general service identifier for the service and the second service identifier is an operator-specific service identifier for the service.

6. A method as claimed in claim 1, wherein the first service identifier and the second service identifier are operator-specific service identifiers for the service.

7. A method as claimed in claim 1, further comprising performing the replacement on each message relating to the communication and containing a service identifier.

8. A method as claimed in claim 1, wherein the service is an application.

9. A method as claimed in claim 1, further comprising forwarding the connection establishment request if the recipient's operator's service identifier for the service was obtained in the interconnection information, otherwise rejecting the connection establishment request.

10. A telecommunications system comprising:
    an apparatus via which a communication establishment request relating to a service to be invoked between a sender of a request and a recipient to whom the request is targeted is routed, the request containing information on the sender of the request and information on the recipient, the information being used for routing the request;
    a database containing interconnection information on the service, the interconnection information indicating allowability of the service between different operators, and comprising, for each operator providing the service, information on a service identifier used by the operator for the service;
    wherein the apparatus is arranged to check, in response to receiving the request, whether or not the request further contains a service identifier identifying the service to be invoked, to retrieve, in response to the request containing the service identifier, the interconnection information from the database using at least the sender's operator and the service identifier as search keys, to use the interconnection information to conclude whether to reject or to forward the request, and if the communication request is not rejected to replace the service identifier in the request with a service identifier used by the recipient's operator before forwarding the request.

11. A telecommunications system as claimed in claim 10, wherein
    the interconnection information comprises operator-related policy rules; and
    the apparatus is further configured to conclude on the basis of the retrieved policy rules whether or not the request is an allowable one, to reject the request if it is not an allowable one, and to forward the request if it is an allowable one.

12. A telecommunications system as claimed in claim 10, wherein the apparatus is configured to compare the service identifier in the request with the service identifier used by the recipient's operator and only in response to the service identifiers being different, to replace the service identifier in the request with the service identifier used by the recipient's operator.

13. A telecommunications system as claimed in claim 10, wherein the system comprises operator core networks configured to identify the service on the basis of the service identifier in the request, and to store the service identifier for charging purposes or to be used for policy control.

14. A telecommunications system as claimed in claim 10, wherein the apparatus is further configured to perform the replacement of the service identifier on subsequent messages relating to the communication and containing a service identifier.

15. A telecommunications system as claimed in claim 10, wherein the system further comprises an inter operator backbone network, the apparatus is a proxy in the inter operator backbone network, and the database is an international roaming IR.21 database also containing IP addresses of operator gateway nodes.

16. An apparatus comprising
   at least one processor; and
   memory including at least one software routine,
   the memory and the at least one software routine are configured to, with the at least one processor, cause the apparatus at least to:
   receive a communication establishment request for a service, the request containing information on a sender of the request and information on a recipient to whom the request is targeted, the information being used for routing the request;
   detect, in response to the request further containing a service identifier, that the request relates to a service to be invoked between the sender of a request and the recipient to whom the request is targeted;
   retrieve, in response to said detection, interconnection information on the service using at least the sender's operator and the service identifier as search keys, the interconnection information indicating allowability of the service between different operators;
   determine, using the retrieved interconnection information, whether to reject or to forward the request; and
   if the request is not rejected, replace the service identifier in the request with a service identifier included in the interconnection information as a service identifier of the recipient's operator for the service.

17. An apparatus as claimed in claim 16, wherein the memory and the at least one software routine are configured to, with the at least one processor, further cause the apparatus to conclude on the basis of policy rules included in the interconnection information whether or not the request is an allowable one, to reject the request if it is not an allowable one and to forward the request if it is an allowable one.

18. An apparatus as claimed in claim 16, wherein the memory and the at least one software routine are configured to, with the at least one processor, further cause the apparatus to reject the request in response the retrieved interconnection information not containing the service identifier of the recipient's operator for the service.

19. An apparatus as claimed in claim 16, wherein the memory and the at least one software routine are configured to, with the at least one processor, further cause the apparatus to perform the replacement of the service identifier on subsequent messages relating to the communication and containing a service identifier.

20. An apparatus comprising
    at least one processor; and
    memory including at least one software routine,
    the memory and the at least one software routine are configured to, with the at least one processor, cause the apparatus at least to:
    receive a message from a sender to be forwarded to a recipient, the message containing at least the recipient's address to be used in routing the message;
    detect that the message further contains a service identifier as an attribute;
    retrieve, in response to said detection, a service identifier used by the recipient's operator for the service using at least the recipient's operator and the service identifier in the message as search keys; and
    replace the service identifier in the message with the retrieved service identifier.

21. An apparatus as claimed in claim 20, wherein the message is a session initiation protocol message or a message relating to presence service.

* * * * *